US012597968B2

(12) United States Patent
Murakami et al.

(10) Patent No.: US 12,597,968 B2
(45) Date of Patent: Apr. 7, 2026

(54) BASE STATION, WIRELESS COMMUNICATION SYSTEM, AND WIRELESS COMMUNICATION METHOD

(71) Applicant: NTT, Inc., Tokyo (JP)

(72) Inventors: Tomoki Murakami, Musashino (JP); Masashi Iwabuchi, Musashino (JP); Riku Omiya, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 128 days.

(21) Appl. No.: 18/701,258

(22) PCT Filed: Nov. 1, 2021

(86) PCT No.: PCT/JP2021/040285
§ 371 (c)(1),
(2) Date: Apr. 15, 2024

(87) PCT Pub. No.: WO2023/073996
PCT Pub. Date: May 4, 2023

(65) Prior Publication Data
US 2024/0429976 A1 Dec. 26, 2024

(51) Int. Cl.
*H04B 7/0452* (2017.01)
*H04B 17/40* (2015.01)
(52) U.S. Cl.
CPC ........... *H04B 7/0452* (2013.01); *H04B 17/40* (2015.01)
(58) Field of Classification Search
CPC .... H04B 7/0452; H04B 17/40; H04B 7/0413; H04B 7/06; H04B 7/0617; H04B 17/391; Y02D 30/70
See application file for complete search history.

(56) References Cited

U.S. PATENT DOCUMENTS 7,107,012 B2 * 9/2006 Kashiwagi ............. H04B 7/043
455/448
8,605,708 B2 * 12/2013 Nakamura ............ H04W 16/28
370/347

(Continued)

FOREIGN PATENT DOCUMENTS

JP          2001-298389 A      10/2001
JP          2011-211515 A      10/2011
WO          2017/099077 A1      6/2017

OTHER PUBLICATIONS

Ichitsubo Shinichi, "Establishment of scale model method for radio wave propagation" Grands-in-Aid for Scientific Research Program (KAKENHI), Form C-19, Avaialble Online at: https://kaken.nii.ac.jp/ja/file/KAKENHI-PROJECT-21560403/21560403seika.pdf, May 18, 2012, 10 pages including English Translation.

*Primary Examiner* — Vineeta S Panwalkar
(74) *Attorney, Agent, or Firm* — XSENSUS LLP

(57) ABSTRACT

A base station according to an embodiment is a base station that performs wireless communication with a terminal using a directional antenna within a predetermined area, the base station including: acquisition circuitry configured to acquire data from a database that holds data indicating an antenna directivity suitable for each state of a terminal or each arrival direction of a radio wave from the terminal measured in a scale model in which a structure within a predetermined area is reduced at a predetermined scale factor; collection circuitry configured to collect a state of a terminal or an arrival direction of a radio wave from the terminal in practice within a predetermined area; and controller configured to control directivity of the directional antenna with respect to the terminal in practice within a predetermined area based on the state of the terminal or the arrival direction and data.

8 Claims, 6 Drawing Sheets

(56) References Cited

U.S. PATENT DOCUMENTS

| | | |
|---|---|---|
| 2001/0052875 A1 | 12/2001 | Kohno et al. |
| 2011/0244786 A1 | 10/2011 | Fujii et al. |
| 2018/0357980 A1 | 12/2018 | Miyazaki et al. |

* cited by examiner

BASE STATION, WIRELESS COMMUNICATION SYSTEM, AND WIRELESS COMMUNICATION METHOD

CROSS-REFERENCE TO RELATED APPLICATION

This application is a national stage application, pursuant to 35 U.S.C. § 371, of International Patent Application No. PCT/JP2021/040285, filed Nov. 1, 2021, the entire contents of which are incorporated herein by reference.

DESCRIPTION

Technical Field

The present invention relates to a base station, a wireless communication system, and a wireless communication method.

Background Art

Due to the explosive spread of wireless communication devices in recent years, there is an increasing demand for wireless communication. As one of techniques for increasing the transmission capacity of wireless communication, practical application of massive MIMO transmission using an extremely large number of antennas is progressing. Massive MIMO transmission includes a method to which analog beamforming is applied. For example, the base station performs massive MIMO transmission using digital signal processing after setting antenna directivity to a terminal direction in advance.

In a conventional wireless communication system, in order for a base station to set directivity of an antenna, reception power is measured for each direction of directivity of each antenna by using a training signal.

CITATION LIST

Non Patent Literature

Non Patent Literature 1: Shinichi Ichitsubo, "Establishment of scale model method for radio wave propagation", Grants-in-Aid for Scientific Research (Scientific Research Grants), Research Result Report, [online], May 18, 2012, Form C-19, the Internet <URL:https://kaken.nii.ac.jp/ja/file/KAKENHI-PROJECT-21560403/21560403seika.pdf>

SUMMARY OF INVENTION

Technical Problem

However, when the directivity pattern of the antenna increases, it is conceivable that the time related to the measurement of the reception power increases. In addition, in a case where the terminal or the base station moves, or in a case where the orientation of the terminal changes, the information of the measured reception power becomes old, and thus, there is a case where the effective antenna directivity cannot be set.

The present invention has been made in view of the above-described problems, and an object is to provide a base station, a wireless communication system, and a wireless communication method capable of efficiently setting antenna directivity.

Solution to Problem

A base station according to an embodiment of the present invention is a base station that performs wireless communication with a terminal using a directional antenna within a predetermined area, the base station including: an acquisition unit that acquires data from a database that holds data indicating an antenna directivity suitable for each state of a terminal or each arrival direction of a radio wave from the terminal measured in a scale model in which a structure within a predetermined area is reduced at a predetermined scale factor; a collection unit that collects a state of a terminal or an arrival direction of a radio wave from the terminal in practice within a predetermined area; and a control unit that controls directivity of the directional antenna with respect to the terminal in practice within a predetermined area based on the state of the terminal or the arrival direction of the radio wave from the terminal collected by the collection unit, and data acquired by the acquisition unit.

In addition, a wireless communication system according to an embodiment of the present invention is a wireless communication system in which a base station performs wireless communication with a terminal using a directional antenna within a predetermined area, the wireless communication system including a database that holds data indicating an antenna directivity of the base station suitable for each state of a terminal or each arrival direction of a radio wave from the terminal measured in a scale model in which a structure within a predetermined area is reduced at a predetermined scale factor, the base station includes a collection unit that collects a state of a terminal or an arrival direction of a radio wave from the terminal in practice within a predetermined area, and a control unit that controls directivity of the directional antenna with respect to the terminal in practice within a predetermined area based on the state of the terminal or the arrival direction of the radio wave from the terminal collected by the collection unit, and data held by the database.

In addition, a wireless communication method according to an embodiment of the present invention is a wireless communication method in which a base station performs wireless communication with a terminal using a directional antenna within a predetermined area, the wireless communication method including: an acquisition step of acquiring the data from a database that holds data indicating an antenna directivity of the base station suitable for each state of a terminal or each arrival direction of a radio wave from the terminal measured in a scale model in which a structure within a predetermined area is reduced at a predetermined scale factor; a collection step of collecting a state of a terminal or an arrival direction of a radio wave from the terminal in practice within a predetermined area; and a control step of controlling directivity of the directional antenna with respect to the terminal in practice within a predetermined area based on the collected state of the terminal or the arrival direction of the radio wave from the terminal, and the acquired data.

Advantageous Effects of Invention

According to the present invention, it is possible to efficiently set the directivity of the antenna.

DESCRIPTION OF EMBODIMENTS

Figure 6:
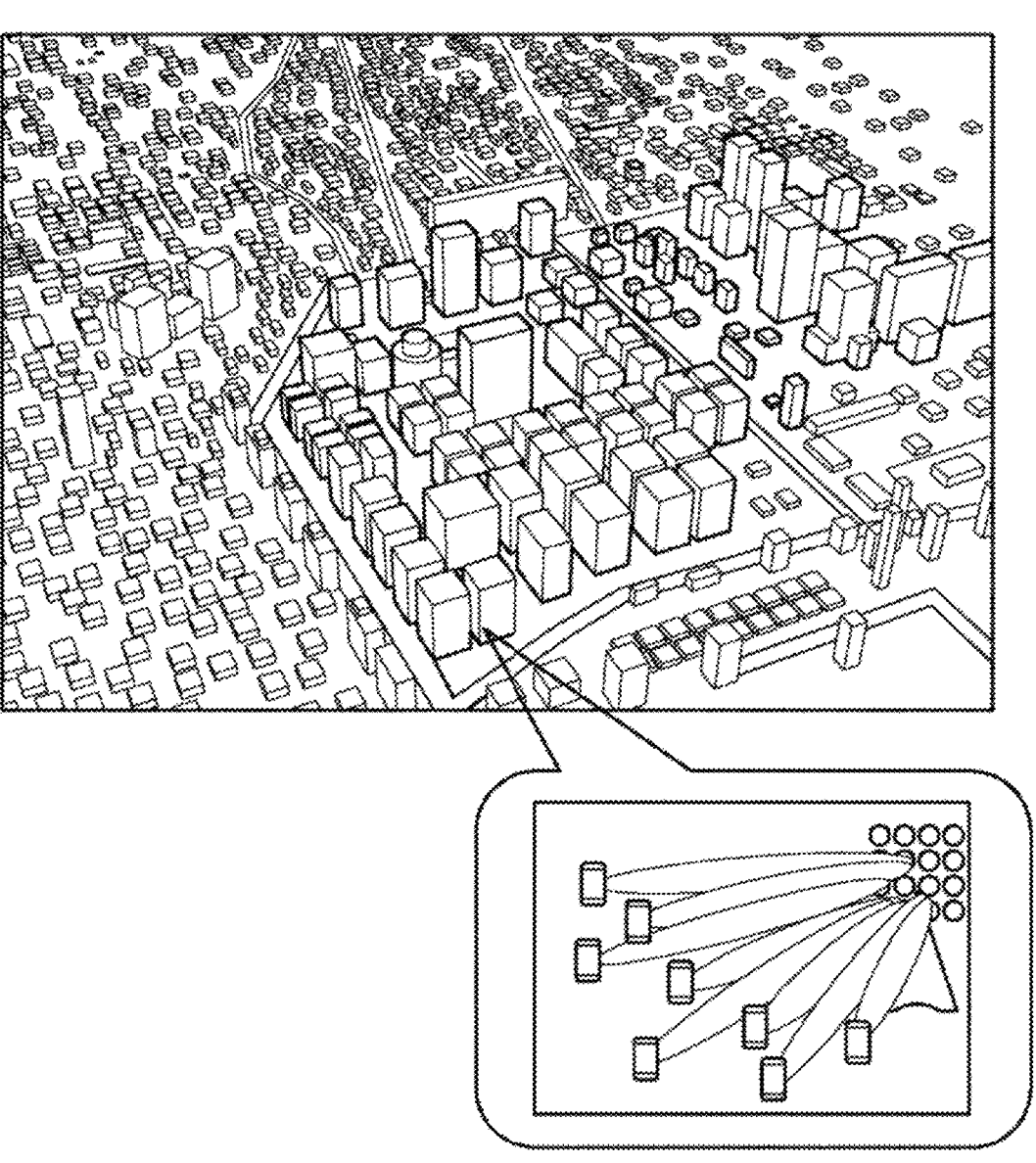
FIG. 6 is a diagram schematically illustrating a wireless communication system of a comparative example.

First, the background of the present invention will be described with reference to FIG. 6. FIG. 6 is a diagram schematically illustrating a wireless communication system of a comparative example.

In the wireless communication system of the comparative example, in order for a base station to set directivity of an antenna, reception power is measured for each direction of directivity of each antenna by using a training signal.

However, when the directivity pattern of the antenna increases, the time related to the measurement of the reception power increases. In addition, in a case where the terminal or the base station moves, or in a case where the orientation of the terminal changes, the information of the measured reception power becomes old, and thus, there is a case where the effective antenna directivity cannot be set.

Therefore, the wireless communication system according to an embodiment is configured to be able to efficiently set the directivity of the antenna.

Figure 1:
FIG. 1 is a diagram illustrating an outline of a configuration of a wireless communication system according to an embodiment.
Figure 1:
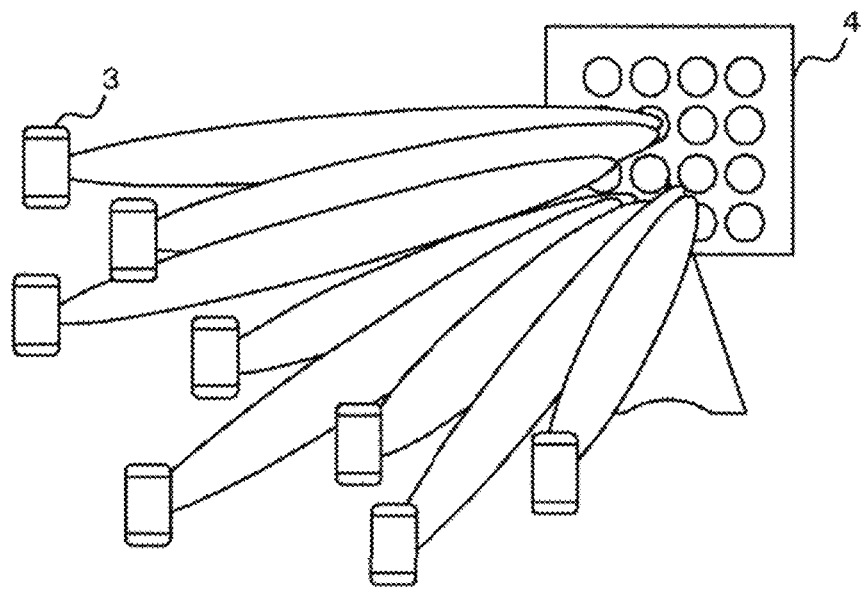

Hereinafter, a wireless communication system according to an embodiment will be described with reference to the drawings. FIG. 1 is a diagram illustrating an outline of a configuration of a wireless communication system 1 according to an embodiment.

As illustrated in FIG. 1, the wireless communication system 1 includes, for example, a base station 2, a plurality of terminals 3, and a reflector 4 (or a relay station). Then, the base station 2 transmits a radio wave to each of the terminals 3 via the reflector 4 and performs wireless communication with each of the terminals 3.

Figure 2:
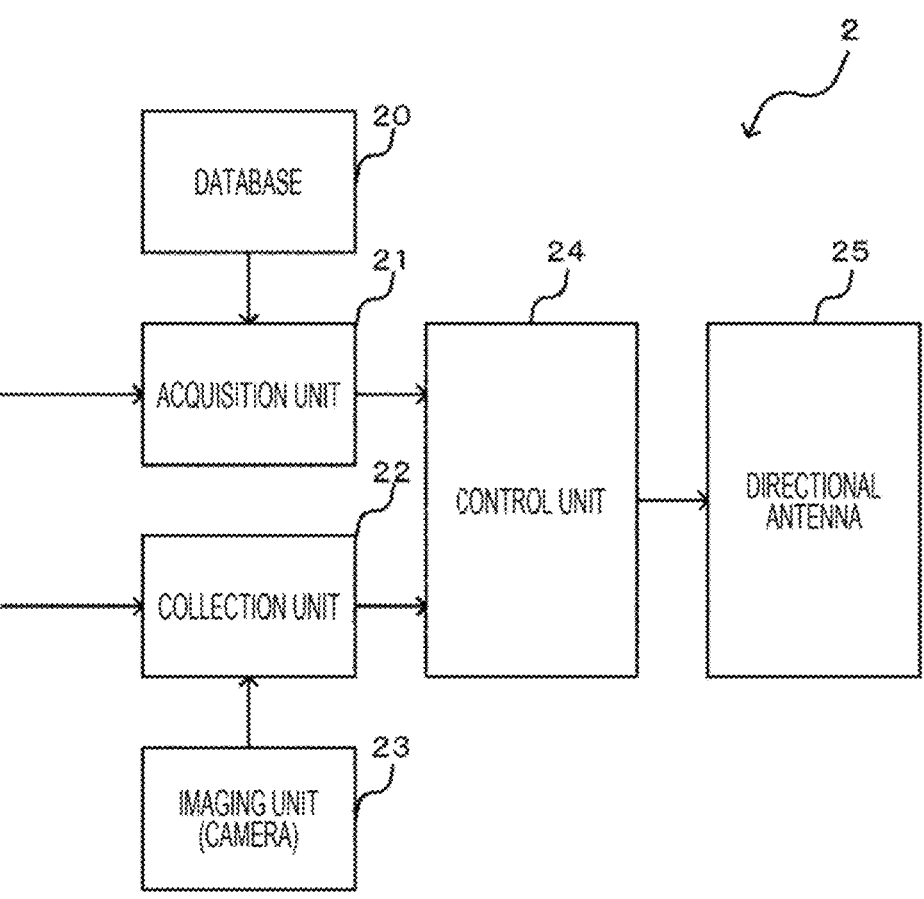
FIG. 2 is a functional block diagram illustrating functions of a base station according to an embodiment.

FIG. 2 is a functional block diagram illustrating functions of the base station 2 according to an embodiment. As illustrated in FIG. 2, the base station 2 includes, for example, a database 20, an acquisition unit 21, a collection unit 22, an imaging unit (camera) 23, a control unit 24, and a directional antenna 25, and performs wireless communication with the terminal 3 using the directional antenna 25 within a predetermined area.

The database 20 is a database that holds data indicating an antenna directivity suitable for each state of the terminal or each arrival direction of the radio wave from the terminal measured in a scale model in which a structure within a predetermined area is reduced at a predetermined scale factor. Note that the database 20 is not necessarily provided in the base station 2, and may be provided in another device.

The acquisition unit 21 acquires data held in the database 20 and outputs the data to the control unit 24.

The collection unit 22 collects the state of the terminal 3 or the arrival direction of the radio wave from the terminal 3 in practice within a predetermined area, and outputs the state or the arrival direction to the control unit 24.

The imaging unit 23 is, for example, an imaging device such as a camera, and captures an image and outputs the image to the collection unit 22.

Note that the collection unit 22 may collect the arrival direction of the radio wave from the terminal 3 based on the shielding environment with respect to the terminal 3 included in the image captured by the imaging unit 23. In addition, the collection unit 22 may collect the arrival direction of a radio wave arriving via the reflector 4 (or a relay station (not illustrated)) illustrated in FIG. 1.

The control unit 24 controls each unit constituting the base station 2. For example, the control unit 24 controls the directivity of the directional antenna 25 with respect to the terminal 3 in practice within the predetermined area based on the state of the terminal 3 or the arrival direction of the radio wave from the terminal 3 collected by the collection unit 22 and the data acquired by the acquisition unit 21.

Next, an operation example of the wireless communication system 1 will be described. First, as initial setting, data indicating an antenna directivity suitable for each state of the terminal or each arrival direction of the radio wave from the terminal measured in a scale model in which a structure within a predetermined area is reduced at a predetermined scale factor is held in the database 20.

Figure 3:
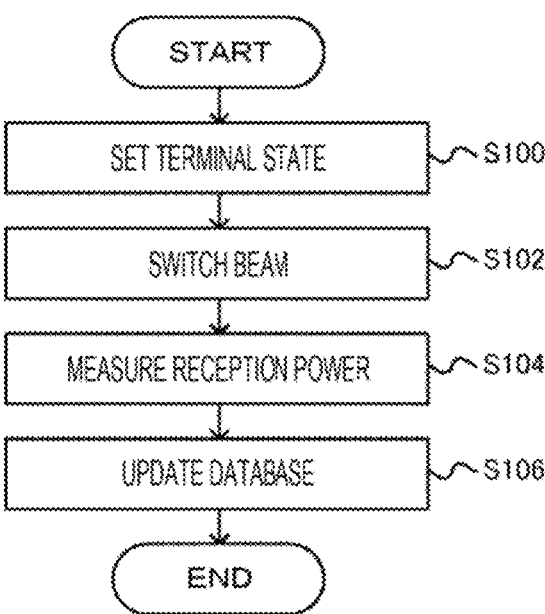
FIG. 3 is a flowchart illustrating processing of holding data in a database as initial setting.

FIG. 3 is a flowchart illustrating processing of holding data in the database 20 as initial setting.

As illustrated in FIG. 3, first, the state of the terminal is set for the directional antenna using the base station and the terminal installed in the scale model described above (S100), and the beam radiated by the directional antenna is switched (S102).

Next, in the base station, for example, the reception power from the terminal is measured, and the state of the terminal within a predetermined area of the scale model or the arrival direction of the radio wave from the terminal is collected (S104).

Then, data indicating an antenna directivity suitable for each state of the terminal or each arrival direction of the radio wave from the terminal measured in a scale model is held in the database 20, and the data is updated (S106).

Figure 4:
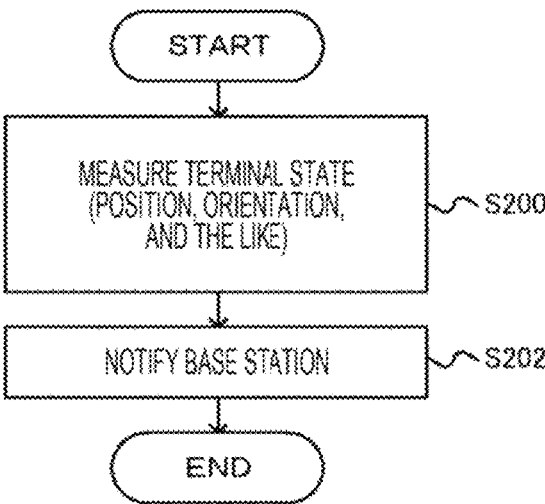
FIG. 4 is a flowchart illustrating an operation example of a terminal.

Next, an operation example of the terminal 3 will be described. FIG. 4 is a flowchart illustrating an operation example of the terminal 3. As illustrated in FIG. 4, the terminal 3 measures the state (position, orientation, and the like) of the terminal (S200) and notifies the base station of the measurement result (S202).

Figure 5:
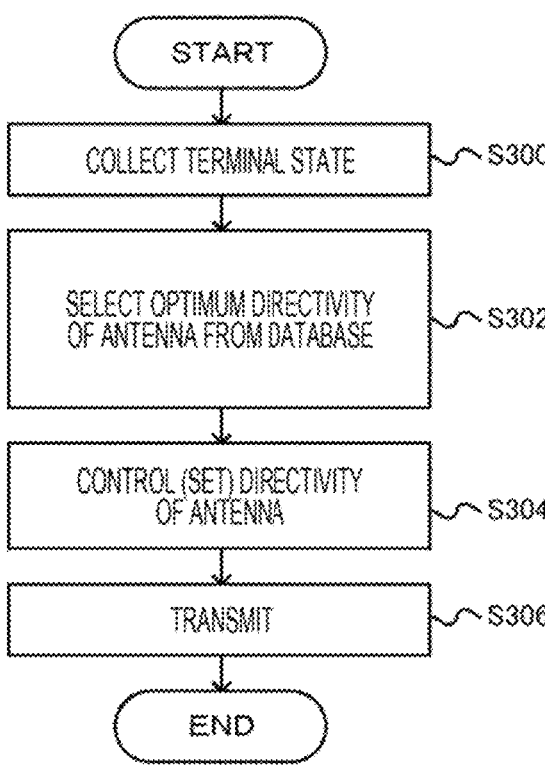
FIG. 5 is a flowchart illustrating an operation example of the base station.

FIG. 5 is a flowchart illustrating an operation example of the base station 2. As illustrated in FIG. 5, in the base station 2, the collection unit 22 collects the state of the terminal 3 in practice (S300).

Next, the control unit 24 selects the optimum directivity of the directional antenna 25 from the database 20 (S302), and controls (sets) the directivity of the directional antenna 25 (S304).

Then, the base station 2 transmits a signal to the terminal 3 by the set directivity of the directional antenna 25 (S306).

As described above, since the wireless communication system 1 controls the directivity of the directional antenna 25 using the data acquired using the scale model, the directivity of the directional antenna 25 can be efficiently set.

Note that some or all of each unit constituting the wireless communication system 1 may be configured by hardware such as a programmable logic device (PLD) or a field programmable gate array (FPGA), or may be configured as a program executed by a processor such as a CPU.

For example, each unit constituting the wireless communication system 1 can be realized by using a computer and a program, and the program can be recorded in a storage medium or provided through a network.

REFERENCE SIGNS LIST

1 Wireless communication system
2 Base station
3 Terminal
4 Reflector
20 Database
21 Acquisition unit
22 Collection unit
23 Imaging unit
24 Control unit
25 Directional antenna

The invention claimed is:

1. A base station to perform wireless communication with a terminal using a directional antenna within a predetermined area, the base station comprising:
   acquisition circuitry configured to acquire data from a database that holds the data indicating an antenna directivity suitable for each state of the terminal or each arrival direction of a radio wave from the terminal measured in a scale model in which a structure within the predetermined area is reduced at a predetermined scale factor;
   collection circuitry configured to collect a state of a terminal or an arrival direction of a radio wave from the terminal in practice within the predetermined area; and
   controller configured to control directivity of the directional antenna with respect to the terminal in practice within the predetermined area based on the state of the terminal or the arrival direction of the radio wave from the terminal collected by the collection circuitry, and data acquired by the acquisition circuitry.

2. The base station according to claim 1, further comprising:
   imaging circuitry configured to capture an image,
   wherein the collection circuitry collects the arrival direction of the radio wave from the terminal based on a shielding environment with respect to a terminal included in an image captured by the imaging circuitry.

3. A wireless communication system in which a base station performs wireless communication with a terminal using a directional antenna within the predetermined area, the wireless communication system comprising:
   a database that holds data indicating an antenna directivity of the base station suitable for each state of the terminal or each arrival direction of a radio wave from the terminal measured in a scale model in which a structure within the predetermined area is reduced at a predetermined scale factor,
   wherein the base station includes:
   collection circuitry configured to collect a state of a terminal or an arrival direction of a radio wave from the terminal in practice within the predetermined area, and
   controller configured to control directivity of the directional antenna with respect to the terminal in practice within the predetermined area based on the state of the terminal or the arrival direction of the radio wave from the terminal collected by the collection circuitry, and data held by the database.

4. The wireless communication system according to claim 3, wherein:
   the base station further includes imaging circuitry configured to capture an image, and
   the collection circuitry collects the arrival direction of the radio wave from the terminal based on a shielding environment with respect to a terminal included in an image captured by the imaging circuitry.

5. The wireless communication system according to claim 3, further comprising:
   a relay station that relays a radio wave or a reflector that reflects a radio wave,
   wherein the collection circuitry collects an arrival direction of a radio wave arriving via the relay station or the reflector.

6. A wireless communication method in which a base station performs wireless communication with a terminal using a directional antenna within a predetermined area, the wireless communication method comprising:
   acquiring data from a database that holds the data indicating an antenna directivity of the base station suitable for each state of the terminal or each arrival direction of a radio wave from the terminal measured in a scale model in which a structure within the predetermined area is reduced at a predetermined scale factor;
   collecting a state of a terminal or an arrival direction of a radio wave from the terminal in practice within the predetermined area; and
   controlling directivity of the directional antenna with respect to the terminal in practice within the predetermined area based on the collected state of the terminal or the arrival direction of the radio wave from the terminal, and the acquired data.

7. The wireless communication method according to claim 6, further comprising:
   capturing an image from the base station,
   wherein in the collecting, the arrival direction of the radio wave from the terminal is collected based on a shielding environment with respect to a terminal included in an image captured in the capturing.

8. The wireless communication method according to claim 6, wherein:
   in the collecting, an arrival direction of a radio wave arriving via a relay station that relays a radio wave or a reflector that reflects a radio wave is collected.

* * * * *